W. M. Doty,
Pruning Hook.

No. 98,575.   Patented Jan. 4, 1870.

William M. Doty
by his attorney
A. Pollok

WITNESSES.

United States Patent Office.

WILLIAM M. DOTY, OF WOODBRIDGE, NEW JERSEY.

IMPROVEMENT IN PRUNING-HOOKS.

Specification forming part of Letters Patent No. 98,575, dated January 4, 1870.

*To all whom it may concern:*

Be it known that I, WILLIAM M. DOTY, of Woodbridge, county of Middlesex, and State of New Jersey, have invented certain new and useful Improvements in Pruning-Hooks; and I hereby declare the following to be a full, clear, and exact description of the same, reference being had to the accompanying drawings, in which—

Figure 1:
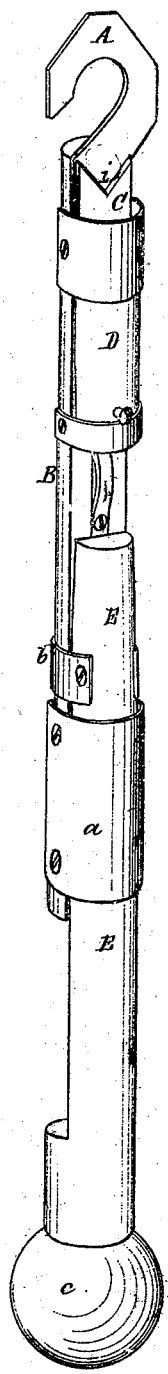
Figure 2:
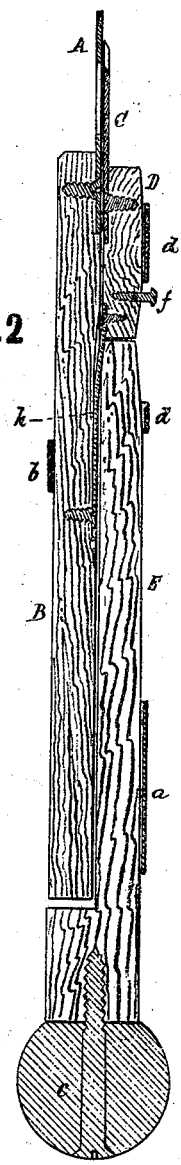

Figure 1 represents a perspective view of a pruning-hook made in accordance with my invention. Fig. 2 is a longitudinal central section of the same.

The pruning-hook in which my invention consists is composed of three essential parts—viz., the hook and stock to which it is attached, the chisel or blade which acts in conjunction with the hook to cut the branch or twig caught by the hook, and a percussion rod or plunger for striking the chisel and driving it toward the hook. The chisel is held to the hook-stock in such manner as to be capable of sliding toward or away from the hook, and is driven or forced toward the hook by means of the percussion-rod, which is arranged or held to the stock upon which the hook is mounted, in rear of and so as to be capable of sliding toward or away from the base of the chisel. I prefer to combine with the chisel a recoil-spring, or spring for drawing back the chisel after it has been driven up toward the hook by the pressure or impact of the percussion-rod; and I also prefer to make the cutting end of the chisel forked or V-shaped, so that when driven upward to cut the branch held by the hook it will make a double draw cut, thereby severing the branch with greater ease and more expeditiously than could be done with a plain straight cutting-edge. These and other features will best be understood by reference to the accompanying drawings, in which—

A represents the metallic hook, and B the stock on which the same is mounted. C is the chisel, mounted on a sliding block or piece, D. E is the sliding percussion rod or plunger, which, by means of the chisel, is driven upward toward the hook.

The stock B is made of any ordinary or suitable shape, preferably "half-round," having a flat face, upon which the corresponding faces of the percussion-rod and chisel can slide. The rod and piece to which the chisel is attached are also semi-cylindrical in shape, so that when the parts B D E are brought together they will form a cylindrical or nearly cylindrical rod.

The percussion-rod is, as shown in the drawings, held to the stock B by a lower band, $a$, attached to the stock, and passing around the rod, and an upper band, $b$, attached to the rod and passing around the stock, so that the rod is not only well steadied and supported in its sliding movement, but is prevented by the relative positions of the two bands from dropping off from the stock. I prefer to make the stock slightly increase in size toward its lower end, for thereby the band $b$ may be jammed upon or caused to embrace tightly such enlarged part by drawing down the rod forcibly, and the pruning-rod will be by this means lengthened, so as to permit the hook to be raised and catch branches which could not conveniently be reached were the stock not thus prolonged. The two members B E thus constitute, in effect, a split and banded rod, which may be elongated at pleasure in the manner described. I find it advantageous to weight the lower end of the rod E, as shown at $c$, for thereby a more forcible and effective blow upon the chisel may be delivered, and it will also drop back more readily and quickly after the blow has been delivered.

The chisel or the block or piece to which it is attached slides upon the upper part of the hook-stock, to which it is held by bands $d$. The base of the chisel is arranged in proper position with relation to the rod E, so that the chisel may be driven upward toward the hook whenever desired, and a stop, $f$, upon the chisel is provided, which, by striking against one of the bands $d$, according as the chisel moves up or down, prevents the same from moving too far in either direction.

To cause the more certain and speedy retraction of the chisel after it has been driven upward by the percussion-plunger, I provide a recoil-spring, $h$, made of vulcanized rubber or other suitable material, one end of which is fastened to the hook-stock and the other to the chisel. This spring yields when the chisel is subjected to the impact of the percussion-rod; but when the force of the blow is spent, or when its power is not counteracted in other ways, its contraction serves to draw down the chisel quickly and with certainty. The advantage of this arrangement will be apparent, for, supposing a branch to be caught and held in the hook, the chisel is driven up against the branch by a blow upon the weighted percussion-rod, and if the branch be too thick to be severed at one stroke a series of blows are delivered by the rod, which drops back after each blow. While the blows are struck, the chisel does not ordinarily drop back; but its blade is usually jammed or held so tightly in the cut in the branch as to counteract the force of the recoil-spring, and thus hold the chisel to the branch which it is to cut. When, by the successive strokes of the weighted rod, the branch is completely severed, then, there being nothing to resist the contraction of the spring, the chisel is at once retracted to its normal position.

In order to cause the chisel to cut with greater ease and quickness, I give its cutting end or edge a V or forked shape, as shown at $i$, Fig. 1. By this means the cutting end, instead of having a straight plain edge, which would be brought squarely up under the branch has two inclined edges, which, as the chisel is forced up, delivers a "draw cut" on each side of the branch, thus severing the same with greater ease and dispatch and with much less expenditure of power.

In conclusion I would state that the hook may be of any ordinary or suitable form adapted to act in conjunction with the chisel, and that the form, proportions, and construction of the parts herein shown and described may be varied in many respects without departing from the principle of my invention. The plunger E and stock B, constituting the split and banded rod above mentioned, are in practice made quite long, in order to admit of the instrument reaching branches, &c., at a considerable height from the ground.

Having now described my invention and the manner in which the same is or may be carried into effect, what I claim, and desire to secure by Letters Patent, is—

1. A pruning-instrument composed of a pruning hook and stock, in combination with a chisel adapted to move to and from the hook, and a separate rod or plunger for driving said chisel toward the hook, substantially as and for the purposes set forth.

2. The sliding chisel formed with a forked or V-shaped cutting-edge, in combination with the hook, substantially as shown and set forth.

3. The combination, with the hook-stock, of the sliding chisel and spring by which the same is retracted, substantially as described.

4. The percussion rod or plunger weighted at its end, as and for the purposes set forth.

In testimony whereof I have signed my name to this specification before two subscribing witnesses.

WM. M. DOTY.

Witnesses:
A. POLLOK,
JOHN L. BROWER.